(12) United States Patent
Han et al.

(10) Patent No.: US 6,629,056 B2
(45) Date of Patent: Sep. 30, 2003

(54) APPARATUS AND METHOD FOR MEASURING A WEIGHT LOAD EXERTED BY A LEG OF A LAB ANIMAL

(76) Inventors: Hee Chul Han, 23-3 Nonhyun-dong, Gangnam-gu, Seoul 135-010 (KR); Seung Kil Hong, 10-10 Samsung-dong, Gangnam-gu, Seoul 135-090 (KR); Heung Sik Na, Hansung Apt. 102-1701, 470-8 Sindaebang-dong, Dongjak-gu, Seoul 156-010 (KR); Young Wook Yoon, 202-67 Sangdo 4-dong, Dongjak-gu, Seoul 156-034 (KR); Yang In Kim, 511-2 Bangseong-Ri Dae-Kyo Apt. 103-101 Packseok-Myon Yangju-Kun, Kyeunggi-Do 482-833 (KR); Sun Seek Min, Physiology, College of Medicine, Korea University, 126-1 Anam-dong 5-ga, Seongbuk-gu, Seoul 136-705 (KR); Jeong Seok Han, Physiology, College of Medicine, Korea University, 126-1 Anam-dong 5-ga, Seongbuk-gu, Seoul 136-705 (KR)

( * ) Notice: Subject to any disclaimer, the term of this patent is extended or adjusted under 35 U.S.C. 154(b) by 167 days.

(21) Appl. No.: 09/820,536

(22) Filed: Mar. 29, 2001

(65) Prior Publication Data

US 2002/0143493 A1 Oct. 3, 2002

(51) Int. Cl.⁷ .............................................. G01G 19/00
(52) U.S. Cl. .................. 702/173; 702/174; 702/175; 177/132
(58) Field of Search ............................... 702/172, 173, 702/174–175, 182, 186, 127–129, 101; 177/132, 147, 164, 185, 244

(56) References Cited

U.S. PATENT DOCUMENTS 4,427,083 A * 1/1984 Muddle ..................... 177/132
4,804,052 A * 2/1989 Griffen .................... 177/25.14
5,724,267 A * 3/1998 Richards .................... 702/174
5,734,128 A * 3/1998 Gades et al. ................ 177/244

OTHER PUBLICATIONS

Larsen et al., "Reduction in Locomotor Activity of Arthrithic Rats as Parameter for Chronic Pain: Effect of Morphine, Acetylsalicylic Acid and Citalopram," Acta Pharmacol. Et Toxicol., 57:345–351 (1985).

Cain et al., "Pain–Related Disability and Effects of Chronic Morphine in the Adjuvant–Induced Arthritis Model of Chronic Pain," Physiology & Behavior, 62(1):199–205 (1997).

Hallas et al., "Establishment of Behavioral Parameters for the Evaluation of Osteopathic Treatment Principles in a Rat Model of Arthritis," JAOA, 97(4):207–214 (1997).

Sluka et al. "Differential Effects of N–Methyl–D–Aspartate (NMDA) and non–NMDA Receptor Antagonists on Spinal Release of Amino Acids After Development of Acute Arthritis in Rats," Brain Research, 664:77–84 (1994).

Lawand et al., "Nicotinic Cholinergic Receptors: Potential Targets for Inflammatory Pain Relief," Pain, 80:291–299, (1999).

Lu et al., "Gabapentin Attenuates Nociceptive Behaviors in a Acute Arthritis Model in Rats," The Journal of Pharmacology and Experimental Therapeutics, 290(1):214–219 (1999).

(List continued on next page.)

Primary Examiner—Bryan Bui
(74) Attorney, Agent, or Firm—Gibbons, Del Deo, Dolan, Griffinger and Vecchione

(57) ABSTRACT

An apparatus and a method capable of measuring a weight load of an inflamed foot of a lab animal objectively and precisely while the lab animal is walking freely in a non-binding state is provided. A pathway sized depending on a size and a stride of the lab animal is provided in a weight load measuring apparatus, and a weight sensor is attached to a bottom of the pathway. Thus, artificial operations to be applied to the lab animal walking the pathway can be minimized such that the weight load exerted in the inflamed foot can be measured objectively and precisely with time periods.

14 Claims, 6 Drawing Sheets

OTHER PUBLICATIONS

Okuda et al., "Arthritis Induced in Cat by Sodium Urate: A possible Animal Model For Tonic Pain," Pain, 18:287–297 (1984).

Clarke, K.A., "Differential Fore–and Hindpaw Force Transmission in the Walking Rat," Physiology & Behavior, 58(3): 415–419 (1995).

Clarke et al., "Gait Analysis in a Rat Model of Osteoarthrosis," Physiology & Behavior, 62(5):951–954 (1997).

Schott et al., "Weight Bearing as an Objective Measure of Arthritic Pain in the Rat," Journal of Pharmacological and Toxicological Methods, 31(2):79–83 (1994).

* cited by examiner

APPARATUS AND METHOD FOR MEASURING A WEIGHT LOAD EXERTED BY A LEG OF A LAB ANIMAL

BACKGROUND OF THE INVENTION

1. Field of the Invention

The present invention relates to an apparatus and a method for measuring a weight load exerted by a leg of a lab animal. Specifically, the invention relates to an apparatus and a method for estimating the degree of pain felt by an animal on the basis of a weight load exerted by a limb suffering diverse inflammation.

2. Description of the Related Art

The most representative symptom reported by patients suffering diseases such as arthritis is pain in the affected area. This pain can aggravate the condition through a neurogenic inflammation. Namely, an arthritic pain due to inflammation in a peripheral tissue stimulates a primary afferent nerve fiber through various mediators that carries the inflammation, and thus excitability of the primary afferent nerve fiber is increased. The increase in excitability reaches spinal neurons, and as a result, hyperalgesia is induced. Therefore, a full knowledge of the pain will play an important role in understanding and overcoming the disease.

There are various behavioral testing methods, using lab animals, for inspecting the degree of pain due to a disease such as arthritis.

A method of measuring the degree of pain is disclosed in articles entitled 1) "Reduction in locomotor activity of arthritic rats as parameter for chronic pain: effect of morphine, acetylsalicylic acid and citalopram" by Lassen J J and Arnt J, Acta. Pharmacol. Toxicol. (Copenh)., 1985, 57(5), pp. 345., 2) "Pain-related disability and effects of chronic morphine in the adjuvant-induced arthritis model of chronic pain" by Cain C K, Francis J M, Plone M A, Emerich D F and Lindner M D, Physiol. Behav., 1997, 62(1), pp. 199, 3) "Establishment of behavioral parameters for the evaluation of osteopathic treatment principles in a rat model of arthritis" by Hallas B, Lehman S, Bosak A, Tierney S, Galler R, Jacovina P, Scandalis T A and Wells M, J. Am. Osteopath. Assoc., 1997, 97(4), pp. 207, and so on. In this method, a decrease of whole activities of a lab animal having arthritis in a leg is expressed numerically by recording changes in the activities of the lab animal through video analysis. The decrease of whole activity of the lab animal is due to an arthritic pain. This method is considered as a highly reliable test because it can quantify the decrease of the whole activities of lab animals. However, it is difficult to define whether whole activities directly relates to the pain. Also, the method is very expensive and takes much time.

Another method of measuring the arthritic pain felt by a lab animal is disclosed in articles entitled 1) "Different effects of N-methyl-D-aspartate (NMDA) and non-NMDA receptor antagonists on spinal release of amino acids after development of acute arthritis in rats" by Sluka K A, Jordan H H, Willis W D and Westlund K N, Brain. Res., 1994, 664(1–2), pp. 77, 2) "Nicotinic cholinergic receptors: potential targets for inflammatory pain relief" by Lawand N B, Lu Y and Westlund, K N, Pain, 1999, 80(1–2), pp. 291, and 3) "Gabapentin attenuates nociceptive behaviors in an acute arthritis model in rats" by Lu Y and Westlund K N, J. Pharmacol. Exp. Ther., 1999, 290(1), pp. 214. In this method, arthritis is induced in the right leg of a lab animal such as rat by injecting kaolin and carrageenan (suspended in normal saline) into the knee joint cavity; and then the sole of the right foot is stimulated with heat. Thereafter, latency of leg withdrawal response to the heat is measured as a degree of the pain. However, the response of the leg against the heat is considered as a secondary hyperalgesia that inflammation of the knee affects the leg by sensitization of central neuron. Therefore, it is difficult to ascertain whether the method measures the pain caused by the inflammation induced in the knee.

Further, alternative methods of evaluating inflammation caused in a leg by threshold for vocalization or local temperature are known. The threshold value is measured when an inflamed leg of a lab animal is stimulated with pressure and thus the lab animal shrieks with pain, and the local temperature is measured at an inflamed portion. However, the threshold value and the local temperature are not objective and quantitative factors for representing change in primary behavior aspect induced by the pain.

In order to conduct a more accurate behavioral test, a method of evaluating an arthritic pain using decrease of weight load applied in an inflamed leg of a lab animal is disclosed in articles entitled 1) "Arthritis induced in cat by sodium urate: A possible lab animal for tonic pain" by Okuda K, Nakahama H, Miyakawa H and Shima K, Pain, 1984, 18, pp. 287, 2) "Differential fore- and hindleg force transmission in the walking rat" by Clarke K A, Physiol. Behav., 1995, 58(3), pp. 415, 3) "Gait analysis in a rat model of osteoarthrosis" by Clarke K A, Heitmeyer A G, Smith A G and Taiwo Y O, Physiol. Behav., 1997, 62(5), pp. 951, and 4) "Weight bearing as an objective measure of arthritic pain in the rat" by Scott E, Berge O G, Ängeby-Möller K, Hammarstr m G, Dalsgaard C J and Brodin E, J. Pharmacol. Toxicol. Methods, 1994, 1994 31(2), pp. 79. Such a method is based on the fact that the weight load applied in the inflamed leg is decreased due to the arthritic pain. The decrease of the weight load is considered as an objective and quantitative index for representing change of primary behavior aspect induced by the pain. However, typically, the weight load of the inflamed leg of the lab animal is measured under the condition that the lab animal is made to stand up or remain a stationary state. In this case, the lab animal is stressed because it can not move. As a result, the decrease of the weight load is changed depending on a pose or a stress of the lab animal. In addition, the decrease of the weight load appears more precisely when the lab animal is moving freely. Therefore, it is necessary to minimize artificial restraining or manipulations of experimental animals during measuring of the weight load.

SUMMARY OF THE INVENTION

It is, therefore, an objective of the present invention to provide an apparatus and a method with which the weight load of an inflamed limb of a lab animal can be measured objectively and precisely while the lab animal is walking freely in a non-binding state.

In accordance with one aspect of the present invention, there is provided an apparatus for measuring a weight load on a leg of a lab animal, comprising: a long box in which the lab animal moves freely along the length of said long box; and one or more weight sensors attached to the bottom of said long box for measuring the weight load on at least one leg of said lab animal.

In accordance with another aspect of the present invention, there is provided a method of measuring a weight load on a leg of a lab animal, comprising the steps of: providing a box which includes one or more weight sensors to its bottom; causing the lab animal to move through said box; and processing electric signals from said one or more weight sensors to provide information relating to the weight load exerted by a leg of the lab animal.

In accordance with yet another aspect of the present invention, there is provided a method of evaluating severity of pain in an inflamed leg of a lab animal, comprising the steps of: (a) measuring a first weight load on said inflamed leg and a second weight load by an opposite leg to said inflamed leg; and (b) evaluating severity of pain on the basis of said first and said second weight loads, wherein, said measuring step (a) includes the steps of: (a1) providing a box which includes one or more weight sensors to a bottom thereof; (a2) causing the lab animal to walk through said box; and (a3) processing electric signals from said one or more weight sensors to provide information relating to the weight load on said inflamed leg and said opposite leg of the lab animal.

In accordance with yet another aspect of the present invention, there is provided a method of analyzing effects of an analgesic drug on an inflamed leg of an animal, comprising the steps of: (a) providing an animal with inflammation induced in its limb; (b) measuring a first weight load on said limb and a second weight load by another limb opposite to said limb; (c) injecting an analgesic drug into said limb; (d) measuring, after said injecting step (c), a third weight load on said limb and a fourth weight load on said another limb; and (e) computing the ratios of said first weight load to said second weight load and said third weight load to said fourth weight load respectively, to analyze the effects of said analgesic drug, wherein, each of said measuring steps (b) and (d) includes the steps of (bd1) providing a box which includes one or more weight sensors to its bottom; (bd2) causing the lab animal to voluntarily walk through the said box; and (bd3) processing electric signals from said one or more weight sensors to provide information relating to said first to fourth weight loads.

BRIEF DESCRIPTIONS OF THE DRAWINGS

The above and other objects and features of the present invention will become apparent from the following description of preferred embodiments given in conjunction with the accompanying drawings, in which.

DETAILED DESCRIPTION OF THE PRESENT INVENTION

Figure 1:
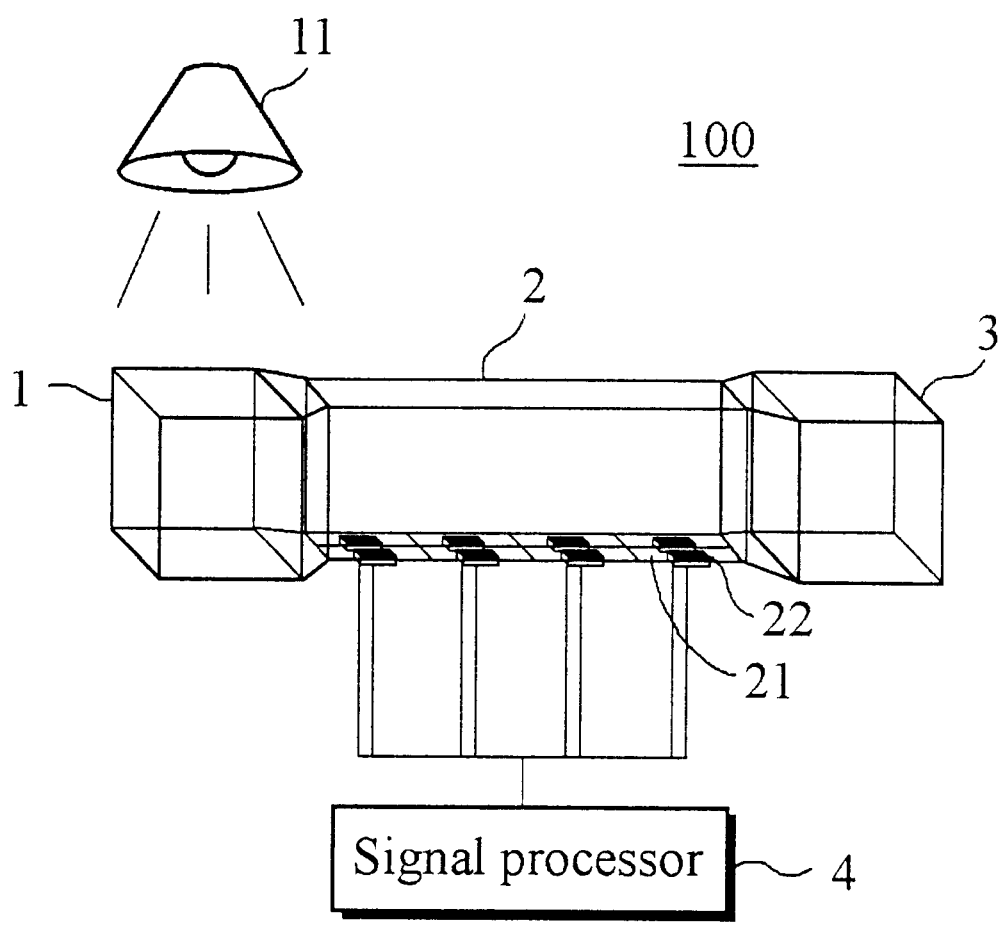
FIG. 1 shows an apparatus 100 for measuring weight load exerted by a foot of a lab animal.

Referring to FIG. 1, a preferred embodiment of the present invention will be described in detail.

FIG. 1 shows an apparatus 100 for measuring weight load on a foot of a lab animal. The apparatus comprises a starting box/cage 1, a pathway 2, an arrival box 3 and a signal processor 4. Except for the signal processor 4, they are sized to comfortably accommodate test animals considering their size and stride. They are made of transparent materials such as acrylic resin to allow an easy observation of the movement of the animals from outside.

The starting box 1 is capable of accommodating a test animal such that the animal can freely move about in any directions and it is opened to the pathway 2. Further, a light 11 is set over the starting box 1 to induce a nocturnal animal to move away from the starting box 1 onto the pathway 2. The side walls of the pathway 2 are built with two movable acrylic plates such that they can travel either toward or away from each other. The effect is that the cross-sectional area along the direction perpendicular to the length of the pathway can be adjusted for animals of different sizes. For each animal the pathway should be narrow enough so that the animal would walk straight. In other words, the narrow path prevents a zig-zag walking pattern. The bottom of the pathway 2 consists of plates or so called footholds 21, which are detached from each other such that an action on a foothold does not affect other footholds at all. The plates/footholds are lined up in two rows. Preferably, each row has at least 4 plates in order to use the mean of measured weight loads, which is statistically more reliable. In general the number of footholds in one row should be selected to give a meaningful mean. The distance between the centers of each pair of footholds, one from each row, is adjusted to be about the same as the distance between the front (or rear) two legs of the tested animal. With this design of pathway the animal is made to walk with the left feet stepping only on the left row of footholds and the right feet stepping only on the right row of footholds. A weight sensor 22 is attached to each of footholds 21 to record the weight applied thereto when the animal steps on the foothold. The weight sensor 22 may be a load cell that converts weight load applied thereon to an electric signal. In this case, the load cell may be a strain gauge, which converts pressure to an electric signal. The signal processor 4 receives the electric signal generated by the weight sensor 22 and processes it to express the weight load numerically.

Figure 2:
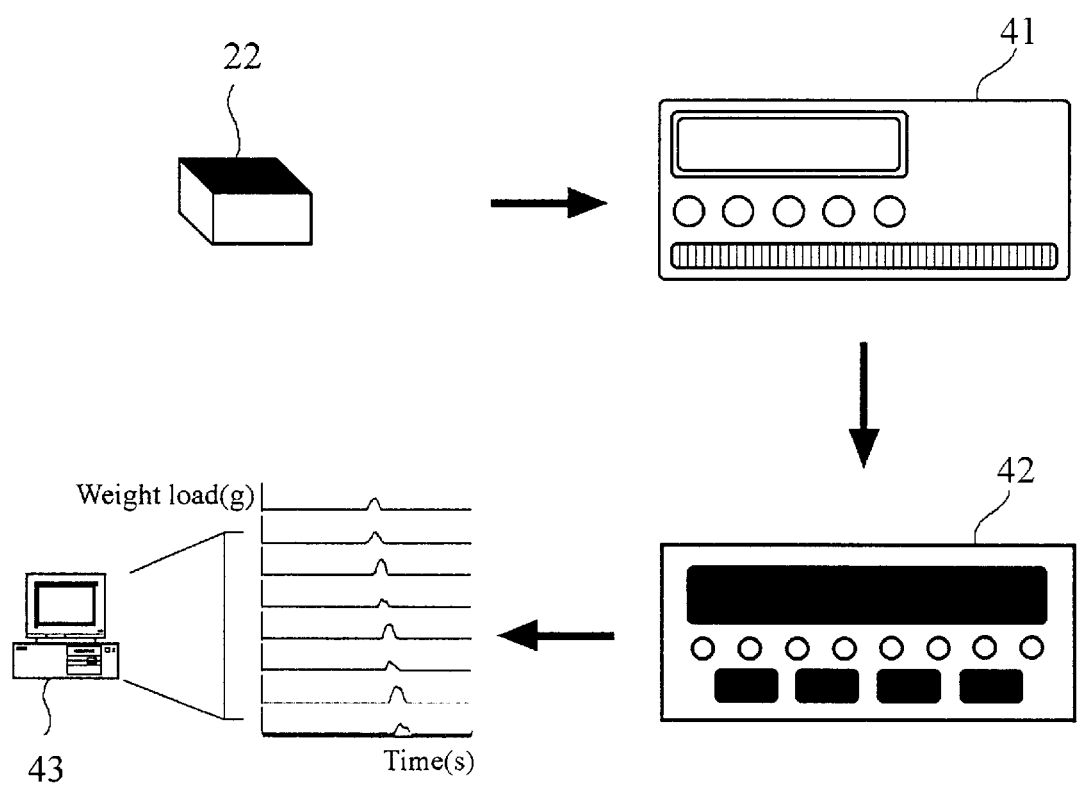
FIG. 2 illustrates a schematic diagram of the signal processor 4 according to the present invention.

FIG. 2 illustrates a schematic diagram of the signal processor 4 according to the present invention. As shown in this figure, the signal processor 4 includes a signal amplifier 41, an analog to digital (A/D) converter 42 and a computing device 43. The signal amplifier 41 is connected to the weight sensor 22 to amplify and filter the electric signal therefrom. In this case, it is desirable to calibrate the amplifying factor of the signal amplifier 41 to ensure that a response of the weight sensor 22 is directly proportional to the weight load. The A/D converter 42 is connected to the output of the signal amplifier 41. Any known A/D converter may be used. The computing device 43 receives the output of the A/D converter 42 to numerically compute the weight load corresponding to the pressure applied to the weight sensor 22. Also, the computing device 43 may provide a time-weight graph which represents the sensed weight with respect to time.

Referring back to FIG. 1, it is preferable that the arrival box 3, similar to the starting box in size and shape, is kept dark inside to motivate the test subject to come toward when the animal is more or less nocturnal. Depending on the nature and characteristic behavior of an animal other means of enticing may be employed. What is important is to make the animal walk in a uniform manner.

Now, a method of evaluating the degree of pain, felt by a lab animal due to arthritis in a leg, using the weight load measuring apparatus 100 is described in detail. Though arthritis is cited here as a cause of disabling free exercise of a limb the present invention can be used to assess the severity of pain by other illnesses affecting motor skills of a subject.

Figure 3:
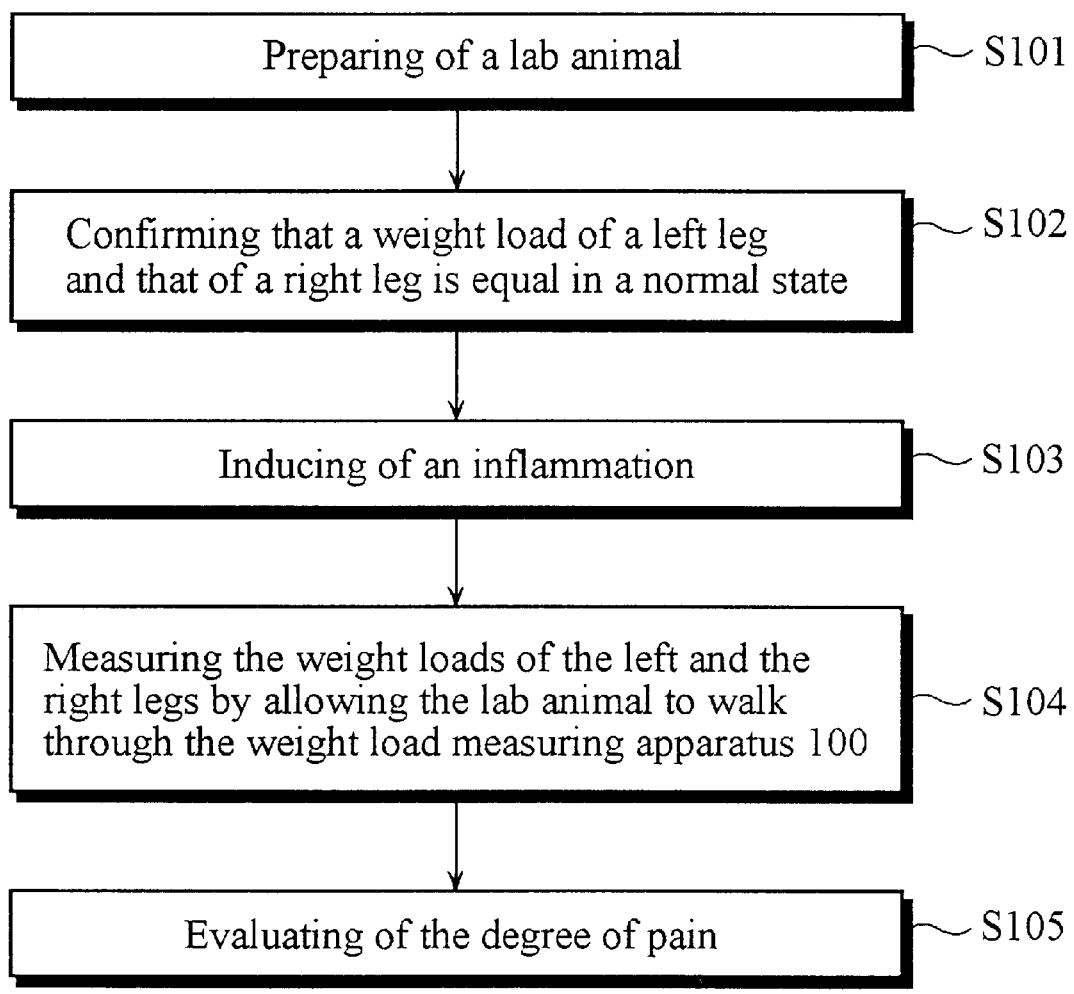
FIG. 3 is a flow chart illustrating the method of evaluating the degree of pain.

FIG. 3 is a flow chart illustrating how the present invention is used for measuring weight load on the legs in free walking.

Firstly, laboratory or "lab" animals, for examples, rats or guinea pigs, are conditioned or trained (step S101). In an experiment utilizing the present invention, Sprague-Dawly species of rats were used. The following description of the method will be made referring to those rates as representative lab animals. The rats are raised under the condition that day and night alternate every 12 hours until they are about eight months old weighing 180–200 g. Water was deprived from 12–24 hours before each weight load test session until the end of it to induce the thirsty rat to move toward water. They are screened to select those suitable for the weight load measuring apparatus 100. After then, they are randomly divided into two groups. Those to be arthritic in their leg are placed in the "test group" and the remaining ones are placed in the "control group."

Then, in order to confirm that weight load exerted by one of the front (or rear) two legs is equal to that by the other of the two legs before injection of an inflammation-causing agent, the animals in the test group are made to walk through the weight load measuring apparatus 100 (step S102), now to be referred to as test group or test animals.

Thereafter, arthritis is induced in any one leg, for example a right hind-leg, of every animal in the test group (step S103). For example 50 $\mu$l of 2% carrageenan suspended in sterile saline, is injected into the knee joint cavity of a leg under gaseous anesthesia. In contrast, control animals are injected with an agent that does not induce arthritis or placebo, for example 50 $\mu$l saline into their knee joint cavities of the animals in the control group.

The weight loads on the left hind and right hind legs of both groups are continually measured for a period of time (step S104). For the purpose, the animals are made to voluntarily walk from the starting box 1 to the arrival box 3 one at a time. Illuminating the starting box with bright light and placing a water bowl in the arrival box helps such a voluntary walk in those water-deprived-of rats that are also known to shy away from light. Then, the weight loads on the footholds are measured as sensed by the weight sensors as the experimental animals walk the pathway. Only footholds that received the whole foot are taken into account for consistency. For this, lab technicians may closely watch the animal walk. Or the monitored foot may be slightly dipped into a pool of ink or paint prior to the walking so that the foot would leave footprints on the footholds as the animal walks. The measured weight loads are normalized. In other words, the weight loads measured on a given day are expressed in terms of its ratio to the total body weight taken on the same day. Then, in order to verify reliability of the measured weight loads, a well known repeated-measures ANOVA test is conducted to check the presence of significant variance among data obtained from a given test group at different points of time and among data obtained from different test groups at a corresponding time point. Well known post-hoc comparison tests are further performed to identify the source (s) of the variance. In this case, $P<0.05$ is considered significant. After then, the mean of the five measured weight loads is computed for each of the left and right leg. This step S104 may be performed periodically, i.e. every two hours, four hours, five hours, and so on after the inflammation was induced.

Figure 4B:
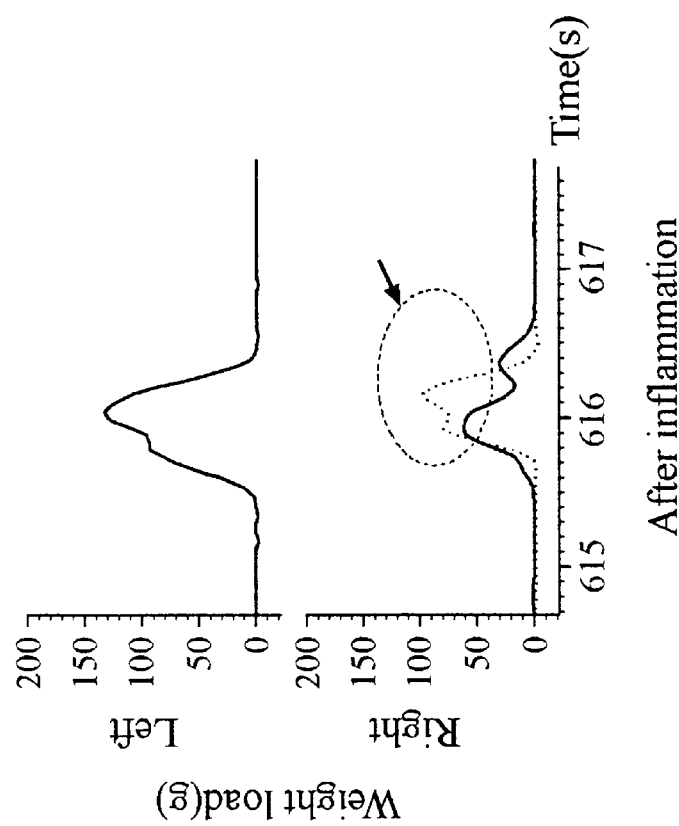
FIGS. 4a and 4b are graphs representing the weight loads exerted by both right and left legs before and after induction of arthritis respectively.
Figure 4A:
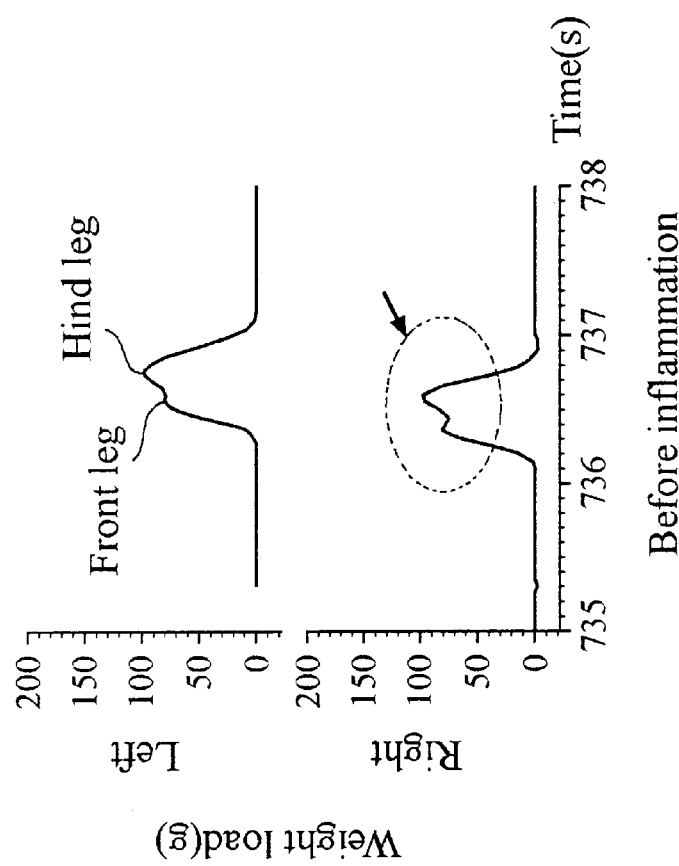

FIGS. 4a and 4b are graphs representing the weight loads exerted by both right and left legs before and after induction of arthritis respectively. In this drawing, the first and second peaks represent the weight loads on the front and hind legs, respectively. As indicated by the curve (b) showing weights after inflammation, the weight load on the arthritic right leg decreases with the course of time while the weight load on the non-arthritic left leg increases, because more body weight of the animal would be gradually shifted to a leg that does not hurt.

Figure 5A:
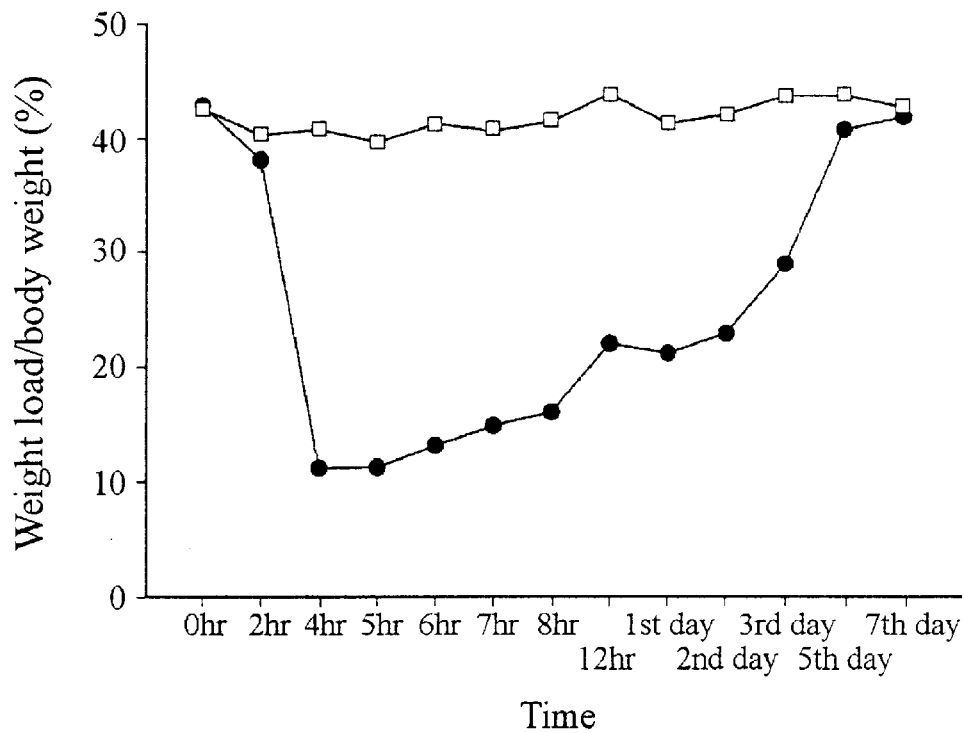
FIGS. 5a and 5b illustrate graphs for comparing changes of the weight loads in the control group and the inflamed group.
Figure 5B:
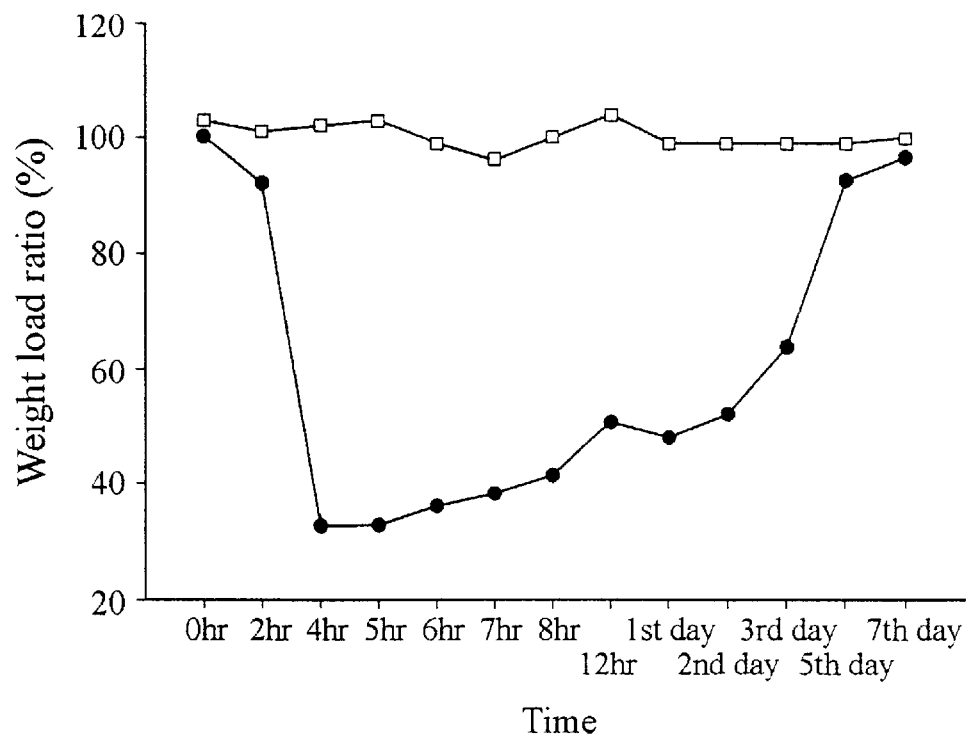

FIGS. 5a and 5b illustrate graphs for comparing changes in the weight loads in the control group and the test group. FIG. 5a shows change in the weight load on the right leg, and FIG. 5b illustrates the ratio of right-leg weight load to left-leg weight load. In FIGS. 5a and 5b, the symbol "□" represents the mean value of the control group and the symbol "●" represents that of the test group. Referring to these figures, in the test group, the decrease of the weight load starts from two hours after arthritis was induced. The decrease in the weight load is greatest for after 4 hours. The decrease is gradually lessened starting from the 6th hour, and the weight load is recovered to the original level after seven days. In contrast, in the control group, the decrease/increase of the weight load on either leg is not observed.

Again, referring to FIG. 3, the degree of pain due to the inflamed right leg can be evaluated on the basis of the weight load obtained in step S104 (step S105) on the hypothesis that animals would less rely on a hurting leg when walking. In other words it is safely assumed that the severity of pain in a leg due to arthritis is inversely proportional to the weight load on the leg. This evaluation may be performed by computing a ratio of the weight load of the inflamed right leg to that of the normal left leg. The smaller the ratio is, the greater the severity of pain is.

Figure 6:
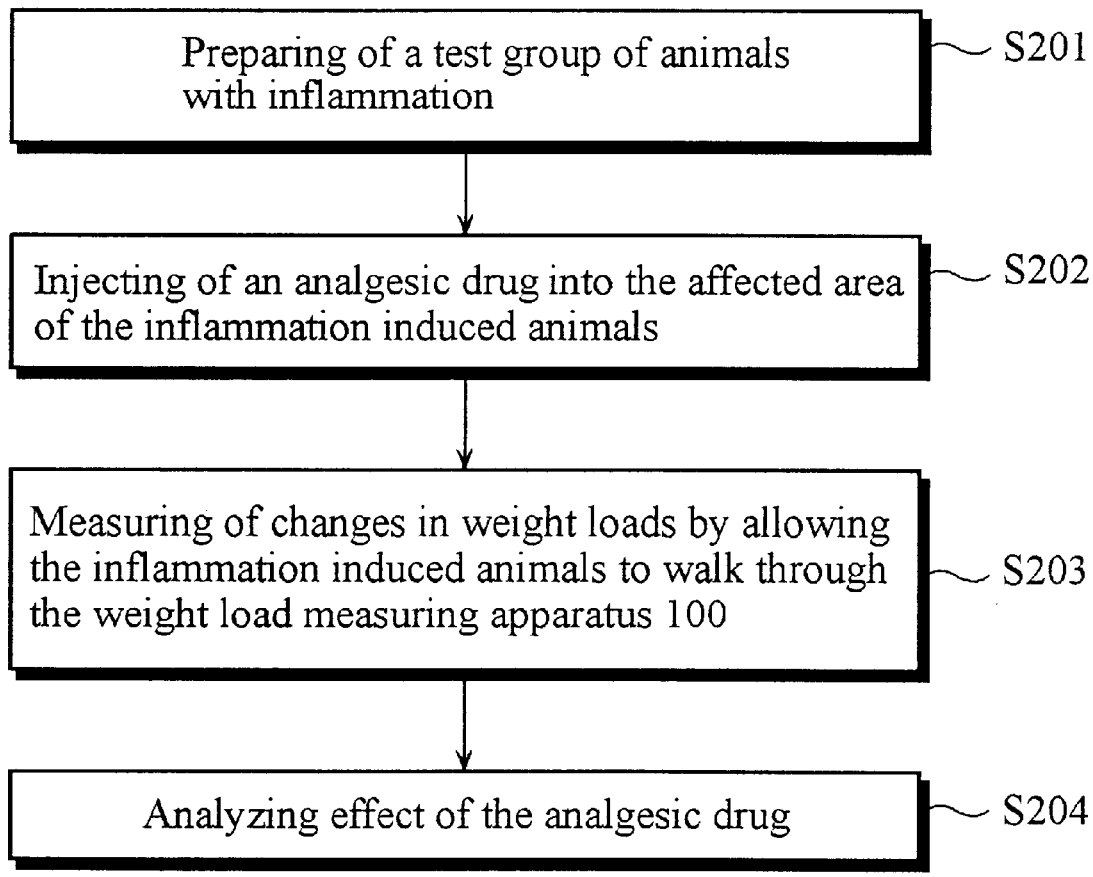
FIG. 6 is a flow chart illustrating an example of the method of analyzing the effects of the analgesic drug according to the present invention.

Next, FIG. 6 is a flow chart illustrating a method of analyzing the effects of the analgesic drug administered to arthritic animals according to the present invention.

Firstly, experimental animals are injected with an arthritis-inducing agent as mentioned above (step S201). Then the arthritic animals are divided into two groups, one group being a test group and the other being a control group. After they show characteristic symptoms of arthritis an analgesic drug of interest is injected into the affected areas of the test animals (step S202) while normal saline is injected into the same body area of the control group animals. Thereafter, the animals are made to periodically walk from the starting box 1 to the arrival box 3 of the weight load measuring apparatus 100 one at a time. Their weight loads on the legs are measured (step S203). Then, based on information obtained in step S203, the effect of the analgesic drug on the pain is estimated by examining changes in the weight load on the legs (step S204) in just the same way changes in the weight loads were measured due to induced arthritis.

According to the present invention, thus, time-varying changes in the weight load on the inflamed leg can be measured objectively and precisely without unnecessarily hurting the animals. Moreover, the present invention helps to measure painful states more realistically and conveniently because pain is estimated while the measurements of weight loads are taken in a realistic regular walking environment. Such weight loads can be used as the objective index for evaluating the severity of pain due to illness that negatively affects the motor skills. Conversely, the effect of analgesic drugs can also be reliably estimated.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto. It goes without saying that the present invention can be applied to the case of analyzing various pains other than the arthritic pain.

What is claimed is:

1. An apparatus for measuring a weight load of a lab animal, comprising:
   a long-box comprised of sidewalls and a bottom, wherein the bottom is comprised of a plurality of independent plates, the plates defining a pathway upon which the lab animal moves freely;
   a plurality of weight sensors for measuring the weight load exerted by an individual leg of the lab animal, wherein each of the plurality of weight sensors is independently attached to a corresponding plate of the plurality of plates on the bottom of the long-box and independently measures the weight load while the lab animal walks freely; and
   a signal processing means for processing an electric signal from each of the plurality of weight sensors, in order to provide a graphical representation of the measured weight load.

2. The apparatus of claim 1, wherein each of the plurality of plates is sized depending on a size and a stride of the lab animal.

3. The apparatus of claim 2, wherein the plurality of plates are arranged along two rows.

4. The apparatus of claim 1, wherein each of the plurality of weight sensors is a load cell.

5. The apparatus of claim 1, wherein the sidewalls of the long-box are movable, such that a width of the pathway defined by the sidewalls is adjustable to a size of the lab animal.

6. The apparatus of claim 1, further comprising:
   a departure box connected to an end of the long-box; and
   an arrival box connected to another end of the long-box, wherein the lab animal is free to walk from the departure box to the arrival box through the long-box.

7. The apparatus of claim 6, wherein the departure box is illuminated by a light source causing the lab animal to walk from the departure box through the long-box to the arrival box.

8. The apparatus of claim 6, wherein the inside of the arrival box is kept dark.

9. The apparatus of claim 1, wherein the graphical representation is a time-dependent graph.

10. A method of measuring a weight load of a lab animal, comprising the steps of:
    (a) providing a long-box comprised of sidewalls and a bottom, wherein the bottom is comprised of a plurality of independent plates, the plates defining a pathway upon which the lab animal moves freely;
    (b) allowing the lab animal to move through the long-box;
    (c) measuring a weight load exerted by an individual leg of the lab animal through a plurality of weight sensors, wherein each of the plurality of weight sensors is independently attached to a corresponding plate of the plurality of plates on the bottom of the long-box and independently measures the weight load while the lab animal walks freely; and
    (d) processing an electric signal from each of the plurality of weight sensors to provide information relating to the weight load.

11. The method of claim 10, wherein the information is a time-dependent graph.

12. A method of analyzing effects of an analgesic drug on an inflamed limb of a lab animal, comprising the steps of:
    (a) providing a box which includes a plurality of sensors attached to a bottom of the box;
    (b) inducing inflammation in a first limb of the lab animal;
    (c) causing the lab animal to walk voluntarily through the box;
    (d) measuring independently a first weight load exerted by the first limb and a second weight load exerted by a second limb opposite to the first limb;
    (e) injecting an analgesic drug into the first limb;
    (f) measuring a third weight load exerted by the first limb and a fourth weight load exerted by the second limb, after causing the animal to walk voluntarily through the box;
    (g) computing a first ratio of the first weight load to the second weight load and a second ratio of the third weight load to the fourth weight load;
    (h) calculating a difference between the first and second ratios; and
    (i) determining the effects of the analgesic drug before and after the injection of the analgesic drug into the first limb, on the basis of the calculated difference.

13. A method of evaluating severity of pain in an inflamed limb of a lab animal, comprising the steps of:
    (a) measuring a first weight load exerted by the inflamed limb and a second weight load exerted by a limb opposite to the inflamed limb,
    wherein the measuring step (a) further comprises the steps of:
      (i) providing a long-box comprised of sidewalls and a bottom, wherein the bottom is comprised of a plurality of independent plates, the plates defining a pathway on which the lab animal moves freely;
      (ii) causing the lab animal to move through the long-box;
      (iii) detecting the first and second weight loads exerted by the inflamed limb and the opposite limb, respectively, of the lab animal through a plurality of weight sensors, wherein each of the plurality of weight sensors is independently attached to a corresponding one of the plurality of plates on the bottom of the long-box and independently measures the weight load; and
      (iv) processing electric signals from the plurality of weight sensors to provide information relating to the first and second weight loads exerted by the inflamed limb and the opposite limb of the lab animal; and
    (b) evaluating severity of pain on the basis of the information relating to the first and the second weight loads,
    wherein the evaluating step (b) further comprises the steps of:
      (i) computing a ratio of the first weight load to the second weight load; and
      (ii) comparing the ratio with a predetermined number to grade the severity of pain.

14. The method of claim 13, wherein the pain is an arthritic pain.

* * * * *

UNITED STATES PATENT AND TRADEMARK OFFICE
CERTIFICATE OF CORRECTION

PATENT NO. : 6,629,056 B2     Page 1 of 1
DATED : September 30, 2003
INVENTOR(S) : Han et al.

It is certified that error appears in the above-identified patent and that said Letters Patent is hereby corrected as shown below:

<u>Title page,</u>
Item [76], Inventors, insert the following:
-- Hee Chul Han
  23-3 Nonhyun-Dong Gangnam-Gu
  Seoul 135-010, Republic of Korea --

Signed and Sealed this

Twenty-seventh Day of January, 2004

JON W. DUDAS
*Acting Director of the United States Patent and Trademark Office*